July 4, 1950 — B. E. O'CONNOR — 2,514,137
VISCOUS ROTARY DAMPER STRUCTURE
Filed May 31, 1945 — 8 Sheets-Sheet 4

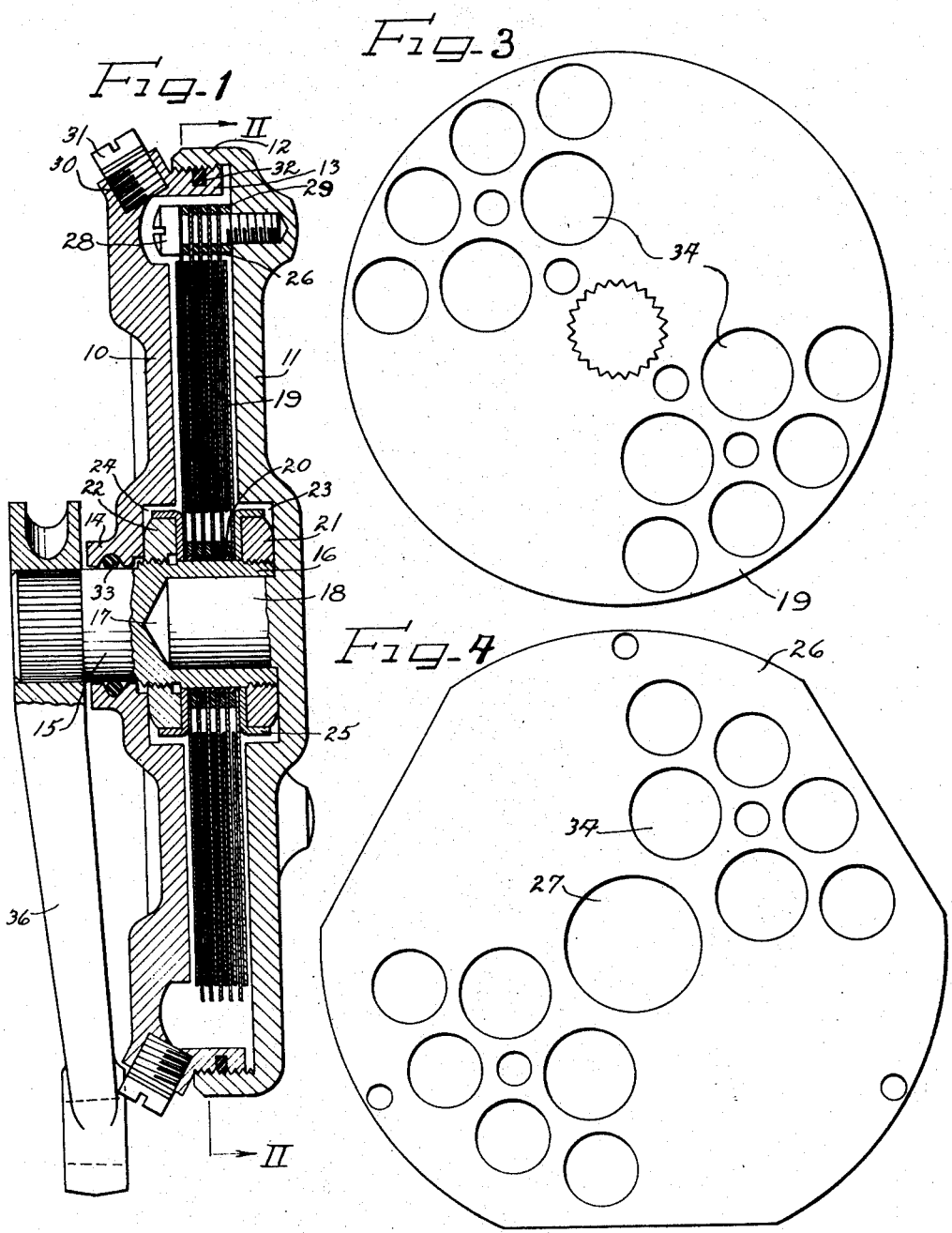

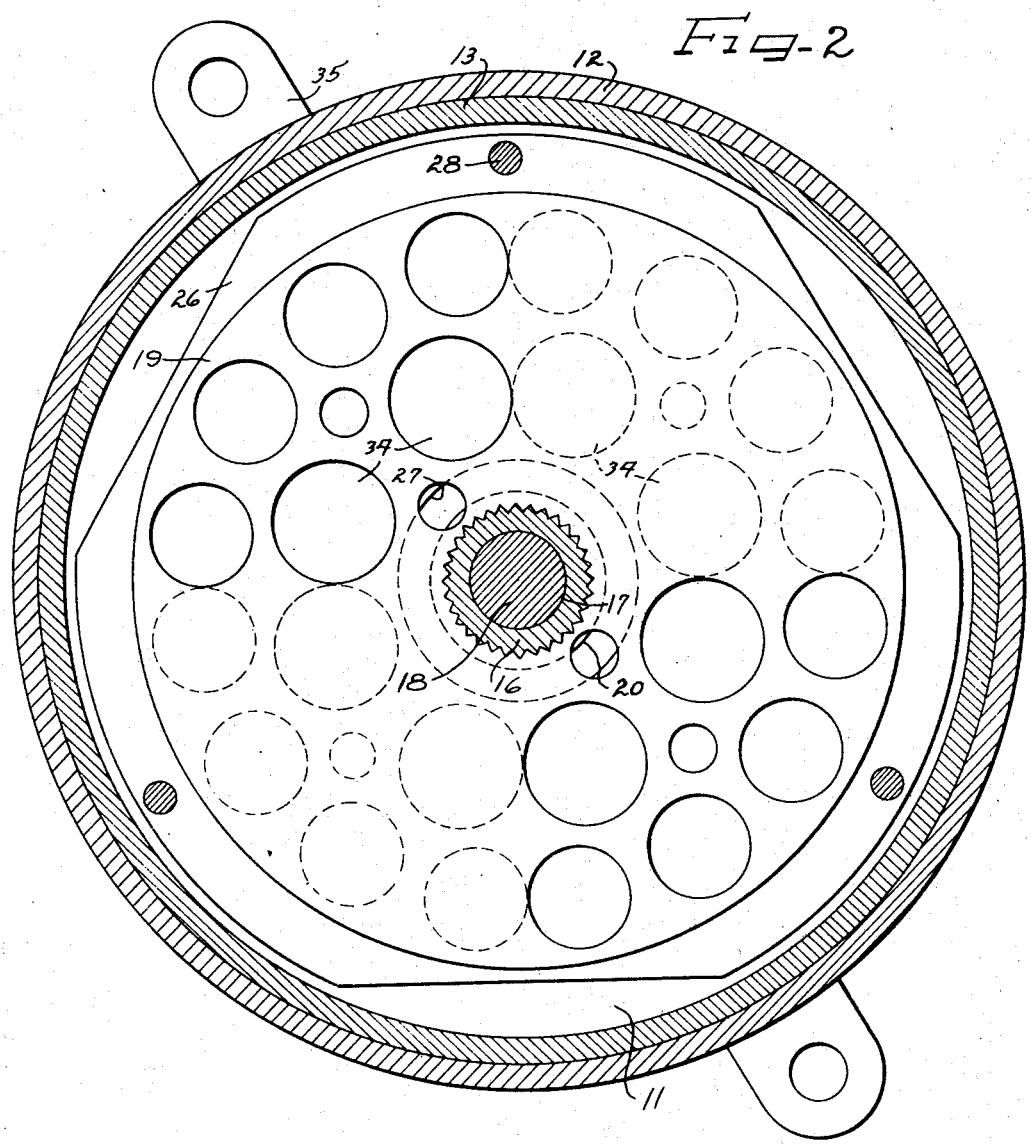

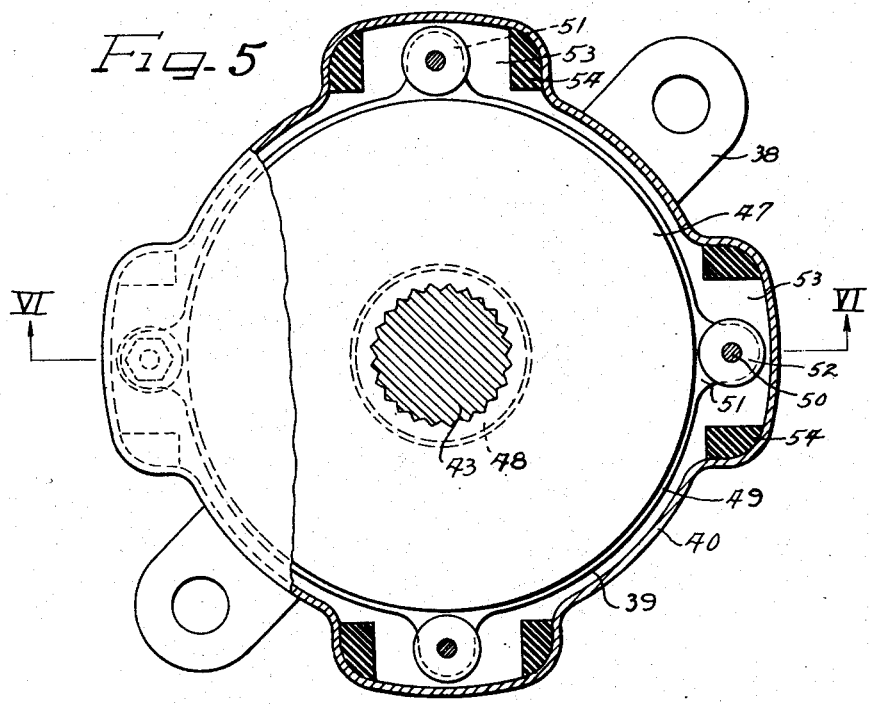
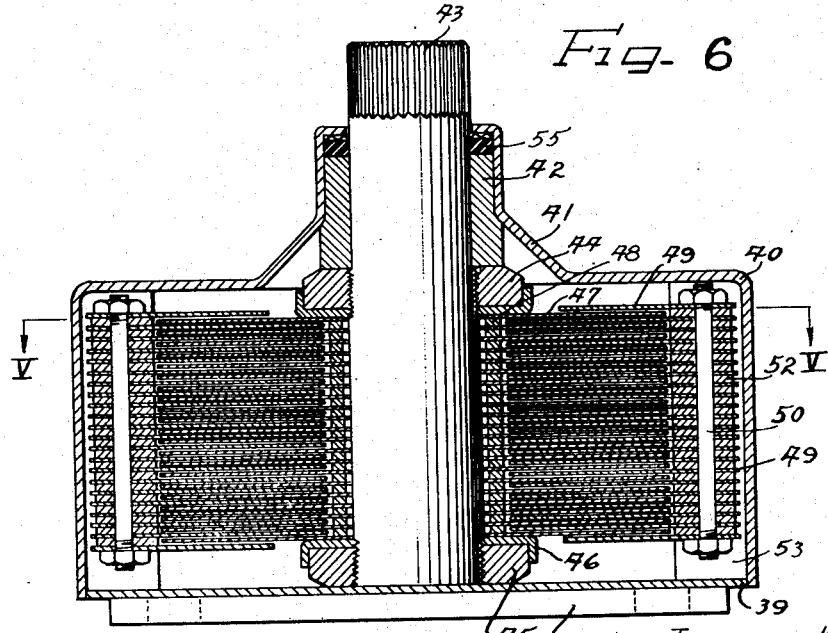

Inventor
Bernard E. O'Connor

July 4, 1950 — B. E. O'CONNOR — 2,514,137

VISCOUS ROTARY DAMPER STRUCTURE

Filed May 31, 1945 — 8 Sheets-Sheet 5

Inventor
Bernard E. O'Connor

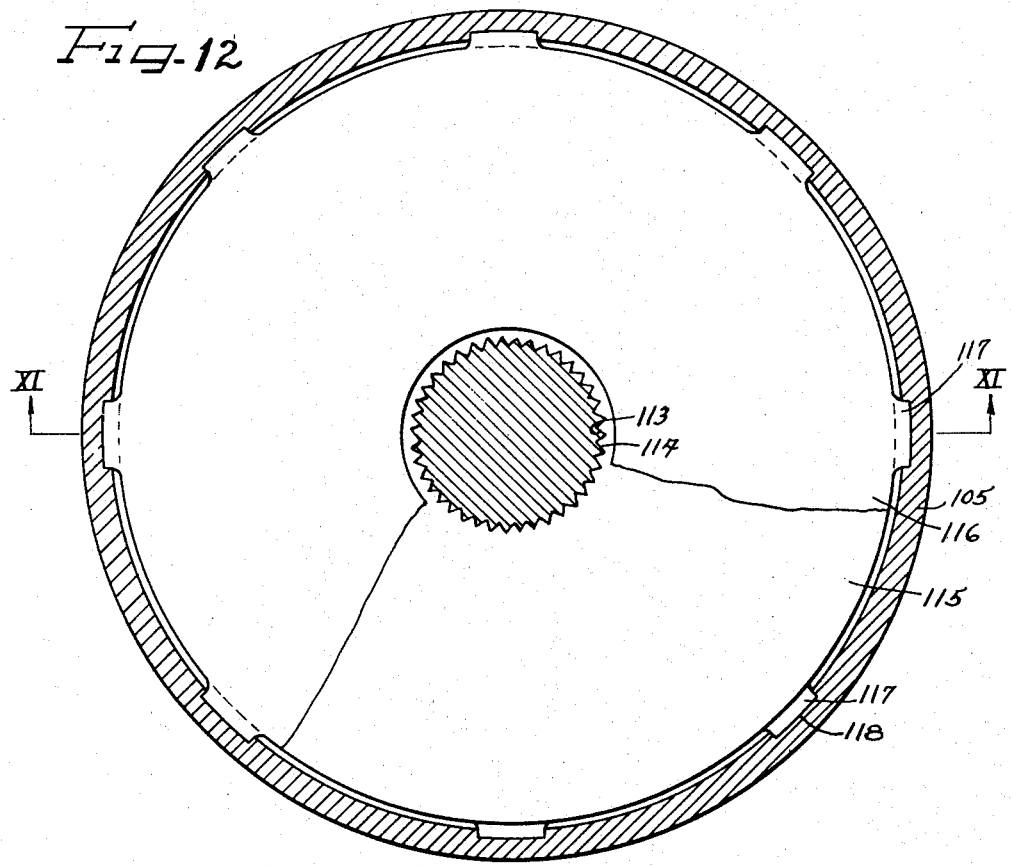
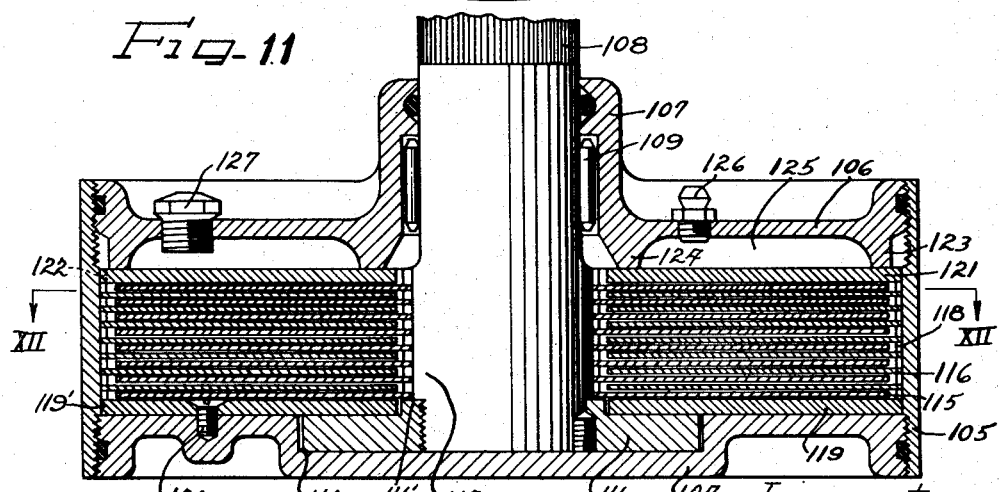

July 4, 1950 — B. E. O'CONNOR — 2,514,137
VISCOUS ROTARY DAMPER STRUCTURE
Filed May 31, 1945 — 8 Sheets-Sheet 7

Inventor
Bernard E. O'Connor
by [signature] Attys

July 4, 1950 B. E. O'CONNOR 2,514,137
VISCOUS ROTARY DAMPER STRUCTURE
Filed May 31, 1945 8 Sheets-Sheet 8

Inventor
Bernard E. O'Connor

Patented July 4, 1950

2,514,137

UNITED STATES PATENT OFFICE 2,514,137

VISCOUS ROTARY DAMPER STRUCTURE

Bernard E. O'Connor, Buffalo, N. Y., assignor to Houdaille Hershey Corporation, Detroit, Mich., a corporation of Michigan Application May 31, 1945, Serial No. 596,911

18 Claims. (Cl. 188—90)

My invention relates to rotary damper structures of the disk type in which sets of disks are concentrically mounted for relative rotation with the disks of one set interposed between the disks of the other set and with the resistance to relative rotation of the disks produced by the resistance to shear of viscous fluid between the plates.

An important object of the invention is to provide improved damper structures of this type and more particularly to provide improved means for adjusting and regulating the viscous resistance for desired operations and functioning of the disk structures for various kinds of service.

The various features and advantages of my invention will become apparent from the following specification in connection with the drawings, in which drawings:

Figure 1 is a side elevation of a rotary damper structure, partly in diametral section;

Figure 2 is a section on plane II—II of Figure 1;

Figure 3 is a plan view of one of the shaft supported disks in the structure of Figure 1, showing holes through the disks;

Figure 4 is a plan view of one of the housing supported disks in the structure of Figure 1, showing the arrangement of holes in the disks;

Figure 5 is a plan view, partly in section, on plane V—V of Figure 6 of a modified form of damper structure;

Figure 6 is a section on plane VI—VI of Figure 5;

Figure 11 is a section of another modified form of damper on line XI—XI of Figure 12;

Figure 12 is a section on plane XII—XII of Figure 11;

Figure 7:
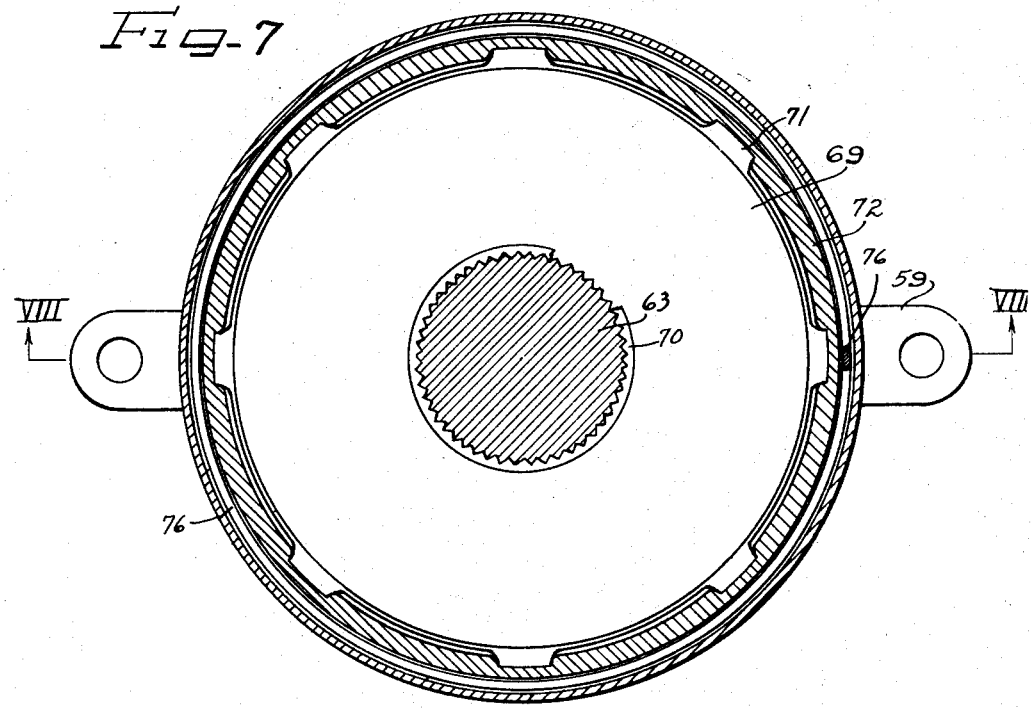
Figure 7 is a section on plane VII—VII of Figure 8, showing another modified form of rotary damper.

Referring to Figures 1 and 2, the structure there shown comprises a cylindrical housing formed by rigid front and rear walls 10 and 11. The back wall 11 has the circumferential internally threaded flange 12 for receiving the threaded flange 13 on the front or cover wall. At its axis, the cover wall has the annular bearing flange 14 thereon for the shaft 15 extending from a hub 16 within the housing, this hub having a bearing bore 17 receiving the cylindrical bearing stud 18 projecting inwardly from the back wall 11. The shaft hub 16 is longitudinally splined to receive a set of complementary splined disks 19 and spaced apart by spacers 20 surrounding the hub 16. The assembled disks and spacers are clamped axially together between nuts 21 and 22 engaging the threaded ends of the hub, recesses 23 and 24 being provided in the back and front housing walls 11 and 10 for receiving the nuts, and preferably bent lock washers 25 are interposed between the nuts and the assembly.

Supported from the back wall 11 is a set of disks 26 which are interposed between the disks 19 on the shaft structure and have axial openings 27 for receiving the shaft hub. The disks 26 are supported on a number of pins or cap screws 28 which have threaded engagement in the back wall 11, spacer washers 29 on the pins being interposed between the plates to hold them properly spaced in relation to the disks 19 between which they extend.

One or more filler openings 30 are provided in the front wall 10 of the housing through which the housing may be filled with a suitable viscous fluid, these openings being normally closed by plugs 31. The spaces between the disk will thus be filled with this viscous fluid, and relative rotation of the shaft and the housing will be resisted and retarded by the resistance to shearing of the film of the fluid between the interleaving and relatively rotatable disks. This retarding force is theoretically proportional to the absolute viscosity of the fluid, the areas of the plates, and to the relative velocity of the disks, and is inversely proportional to the spacing distance between the relatively rotatable disks.

To prevent leakage of the fluid to the exterior of the housing, a thread seal 32 is interposed between the flanges 12 and 13, and a sealing ring 33 is provided between the shaft 15 and the bearing flange 14.

When the disks 19 and 26 are continuous and unbroken, the effective damping surface will remain constant. Provision is preferably made for allowing the effective surface area of the disks to be decreased or increased for differential damping. As shown in Figures 2, 3 and 4, similar series of holes 34 are provided in both sets of disks. When the solid areas of one set of disks exactly coincide with the solid areas of the disks of the other set, maximum fluid film surface and consequently maximum damping effect is obtained. For any other relative position of the disks and the holes therein, the effective area becomes less and therefore the damping constant becomes less. Thus, during relative rotation of the disk sets, the damping resistance may vary.

The back wall 11 of the housing for the disk sets is shown provided with ears 35 whereby the housing may be mounted on a support, and a lever 36 is provided on the end of the shaft 15. The damping structure may be used as a shock absorber on vehicles, or on other machines or devices for controlling the relative movement of two structures or machine parts. When used as a shock absorber on vehicles, the housing is secured by its ears 35, usually to the vehicle chassis, and the lever 36 is connected by a suitable linkage with the axle so that during running of the vehicle relative movement between chassis and axle may be damped and controlled. By proper dimensioning and locating of the holes 34 in the disks, this damping effect may be caused to be greater or less at predetermined points in the operation of the structure during running of the vehicle.

It will be noted that with the structure shown, the extent of relative rotation of the disk sets is not limited. The structure can therefore be utilized in power transmission service. For example, the housing may be secured to one rotatable member which is to be driven by rotation of the shaft 15. The shaft may therefore be directly, or through additional driving means, connected with a driving source. As the viscosity resistance and therefore the damping increases with the relative speed of rotation of the disk sets, the driven member connected with the housing may be started at slow initial speed while the shaft 15 is running at a comparatively higher speed, the viscosity resistance then gradually building up until the driven member reaches the speed of the shaft. Where the disks are provided with holes 34, the speed of the driven member will vary accordingly while the speed of the shaft will remain constant.

In the modified arrangement shown on Figures 5 and 6, provision is made for predetermined distances of unretarded relative rotation of two disk sets. The housing cylinder structure for containing the viscous fluid is shown as comprising a base 37 having ears 38 whereby it may be secured to a support. A back wall 39 is secured to the inner side of the base as by welding. A cylindrical cup-shaped housing 40 is secured as by welding to the back wall 39, the outer wall of the housing part 40 having a bearing flange 41 extending therefrom for receiving a bearing bushing 42 for the shaft 43. Within the housing, the shaft is threaded for receiving clamping nuts 44 and 45 which are faced by clamping washers 46 between which a set of disks 47 is clamped, these disks being splined to the shaft and separated by spacer rings 48. The disks 49 are not directly connected to the housing structure but are assembled on bolts 50 which extend through ears 51 on the disks, spacer rings 52 being interposed between the disks for proper alignment and spacing thereof relative to the disks 47 on the shaft. The cylindrical wall on the housing part is radially deflected or bulged outwardly at spaced intervals to provide recesses 53 in which the bolt and disk ear assemblies extend. Bumpers 54 of suitable material such as rubber are mounted at the sides of the recesses to act as stops for the bolt and ear assemblies. The assembly of the disks 49 may thus rotate independently of the housing structure until one of the bumpers is engaged, whereafter the housing structure will rotate with the disk assembly. The housing is kept filled with the viscous fluid and a sealing gasket 55 is secured within the bearing 21 around the shaft to prevent leakage of the fluid.

The structure shown on Figures 5 and 6 may be utilized as a shock absorber on vehicles in which case the housing is secured by its ears 38 to the vehicle chassis and the lever 56 on the shaft is connected by suitable means with the vehicle axle. The housing structure might also be secured to some rotary machine part with driving means connected with the shaft for oscillation or rotation thereof. While the assembled eared ends of the disks 49 travel within the recesses 53, the viscous drag between the shaft disks and the disks 49 will rotate the disks until their eared ends abut one of the bumpers whereafter the load on the housing by the driven member will be taken up and the shearing resistance of the fluid between the disks will transmit the power from the shaft to the load on the housing for rotation or oscillation of the structure to be driven.

Figure 8:
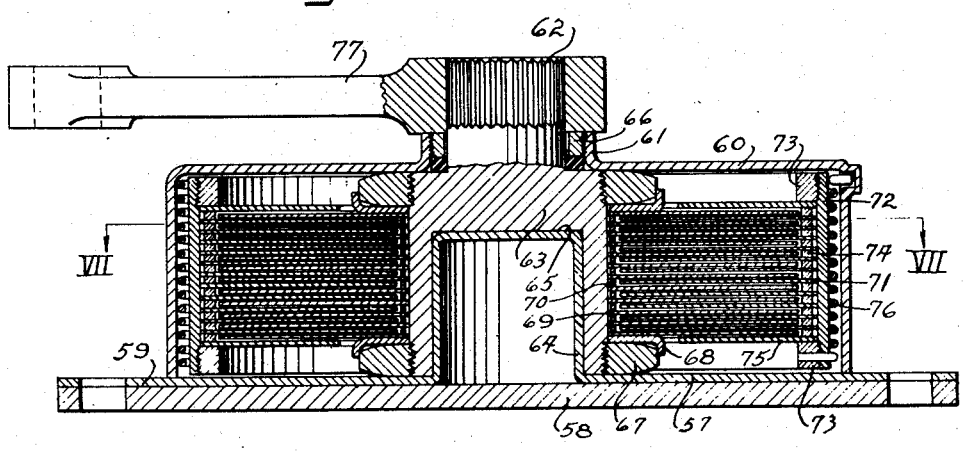
Figure 8 is a section on plane VIII—VIII of Figure 7.

Figures 7 and 8 show a modified arrangement in which, instead of comparatively free movement to a predetermined extent between the housing and the disk assembly, retarding means such as spring means are interposed between the housing and the disk assembly. The structure shown comprises a housing back wall 57 of sheet material which is secured to a mounting base 58 having ears 59 thereon. A cylindrical cup-shaped housing member 60 of sheet metal is secured at its outer edge as by welding to the back wall 57, the outer wall having the bearing flange 61 for the shaft 62 whose hub 63 extends within the housing between the front wall and back wall thereof. The back wall has a cylindrical inward deflection 64 engaging in the bore 65 of the shaft to form a bearing support therefor in addition to the bearing flange 61 and the bearing bushing 66 therein.

The shaft hub is threaded at its ends for receiving the clamping nuts 67 faced by clamping washers 68 between which a set of disks 69 is clamped with spacer rings 70 therebetween, the disks having splined connection with the shaft hub so as to rotate therewith.

The disks 71 which extend between the disks 69 are assembled in a sub-housing comprising a cylindrical wall 72 which is internally threaded at its ends for receiving clamping rings 73. The disks 71 at their outer peripheral portions are received between the clamping rings with spacer rings 74 interposed, and preferably the clamping rings 73 are faced at their inner sides by annular clamping plates 75 so as to prevent the disks from bulging out under operating conditions.

Between the sub-housing cylindrical wall 72 and the cylindrical wall of the housing part 60 is interposed a helical spring 76 whose one end is anchored to the sub-housing structure and whose other end is anchored to the main housing part 60.

The housing is kept filled with suitable viscous fluid which fills the spaces between the disks. Suppose the main housing is stationarily mounted and it is desired to dampen the rotation of the shaft 62 by means of its lever 77. The spring is normally relaxed and during the preliminary turning of the shaft, the viscous resistance between the disks will tend to cause the sub-housing with the disks thereon to follow the rotation of the shaft which movement is however resisted and retarded by the winding up or loading of the spring. As the shaft continues to rotate faster and the viscous resistance correspondingly increases, the shaft and the disks thereon will rotate relative to the sub-housing structure and the disks thereon as the viscosity resistance overcomes the spring resistance and then damping of the shaft rotation follows. When the speed of rotation of the shaft is now reduced and as the shaft comes to rest, the spring will return the sub-housing to its normal position as the spring becomes relaxed.

If the main housing were secured to a rotatable structure to be driven from the shaft 62, the preliminary or initial rotation of the shaft would be gradually transmitted to the structure to be driven for gradual starting thereof, and as soon as the spring has become fully loaded the driven structure will be driven from the shaft through the viscosity resistance of the fluid between the disk sets.

Figure 10:
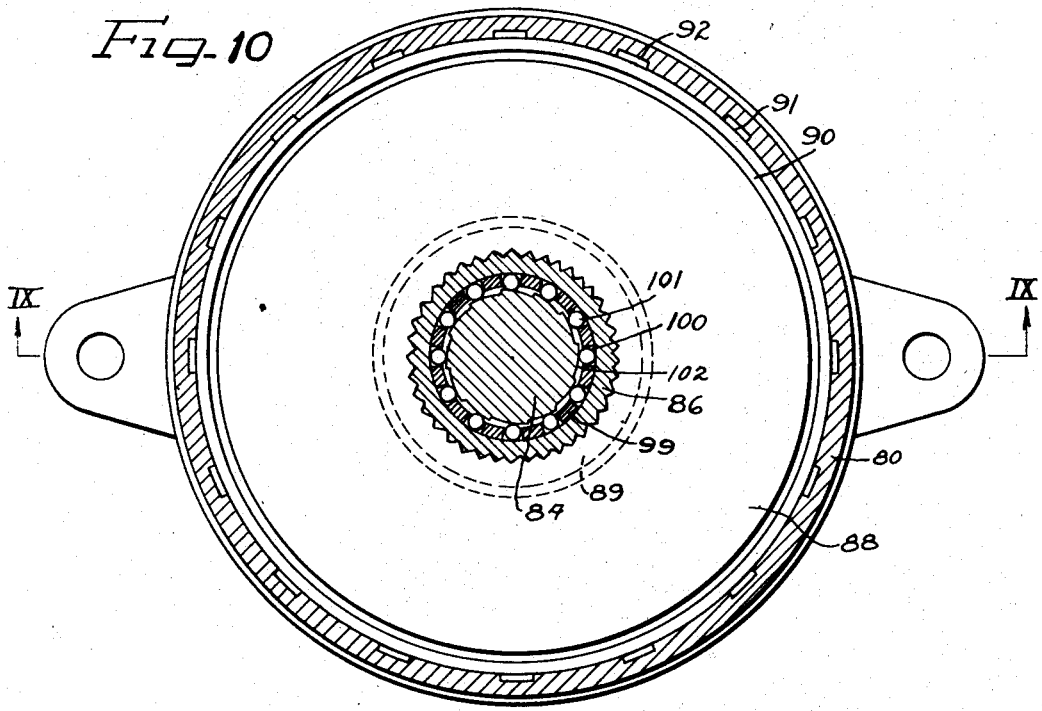
Figure 10 is a section on plane X—X of Figure 9.
Figure 9:
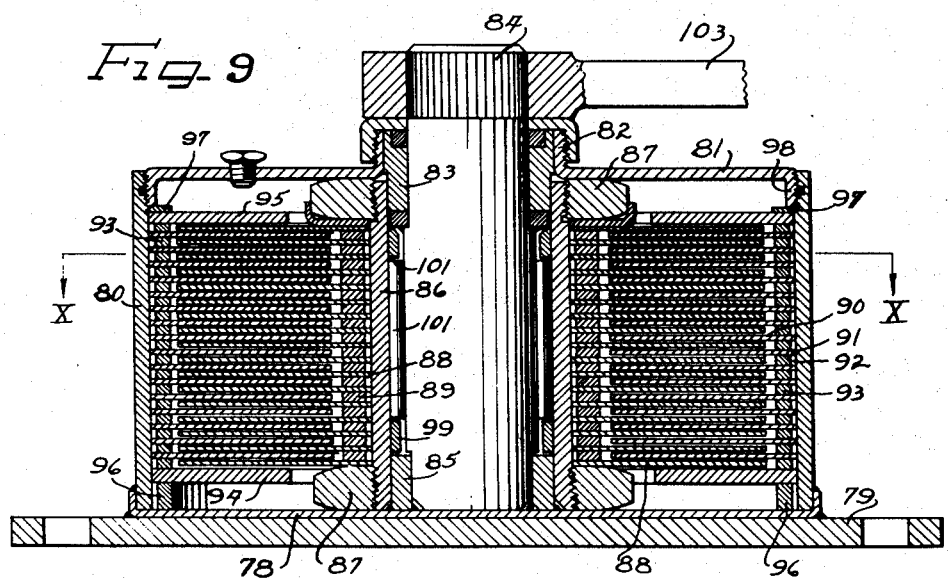
Figure 9 shows another modified form of rotary damper, in section, on plane IX—IX of Figure 10.

Figures 9 and 10 show a modified arrangement in which there is ratchet or over-running clutch connection between a set of disks on a shaft and a set of disks on a housing. The housing structure comprises a back plate 78 secured to a base 79, a cylindrical wall 80 of the housing being secured to the back plate and at its outer end is internally threaded for receiving the end wall or cover 81 which has the annular bearing flange 82 extending therefrom for receiving a bushing 83 for journaling the shaft 84. The back wall 78 of the housing has a bearing ring 85 secured thereto for journaling the inner end of the shaft. Surrounding the shaft is a sleeve 86 which is journaled at its ends on the outer sides of the bushing 83 and bearing ring 85 respectively. This sleeve is threaded at its ends for receiving clamping nuts 87 between which the set of disks 88 which surround the sleeve are clamped, with spacers 89 therebetween, the disks having splined connection with the sleeve 86 to rotate therewith.

The housing disks 90 have tongues 91 extending from their peripheries for engagement in axially extending slots 92 in the housing cylinder wall 80 to be securely held to the housing against rotation relative thereto. The disks 90 are separated by spacer rings 93, the outer ends of the disk and spacer assembly being engaged by end plates 94 and 95. A spacer ring 96 has tongue engagement in the slots 91 and is interposed between the shoulder plate 94 and the back wall 78 of the housing structure. A clamping ring 97 engages with the outer side of the shoulder plate 95 and is engaged by the flange 98 on the cover wall 81 so that when this wall is screwed into the housing cylinder wall 80, the entire assembly including the disks, spacers, and the shoulder plates will be securely clamped in proper axial position for proper interleaving spacing of the disks 90 and the disks 88 on the shaft.

Surrounding the middle portion of the shaft and journaled in the sleeve 86 is a spacer sleeve 99 which has circumferentially spaced apart axially extending slots 100 for receiving clutch rollers 101. The shaft is machined on its outer side to provide inclined end surfaces 102 equal in number to the number of clutch rollers. The arrangement is such that when the shaft is turned relative to the housing in clockwise direction, Figure 10, the inclined surfaces will engage with the rollers to force the rollers radially outwardly into pressure engagement with the sleeve 86 which supports the disks 88, for rotation of the disks with the shaft. When the shaft is rotated in the opposite direction, the cam surfaces will be withdrawn to relieve the rollers of radial outward pressure so that the shaft together with the spacing sleeve 99 may rotate free of the disk set 88. Thus when the shaft is rotated in clockwise direction, as by its lever 103, the set of disks 88 will rotate relative to the set of disks 90 on the housing and the rotation of the shaft will be damped by the viscosity resistance of the fluid between the disks, but the shaft may be rotated freely in the opposite direction without rotating the sleeve 86 with the disks 88 thereon. Thus, where the structure is installed to function as a shock absorber, as in a vehicle, where the housing structure is mounted on the vehicle chassis and the lever 103 connected with the vehicle axle, relative movement of the chassis and axle in one direction will be damped but movement in the other direction will be free.

In the structure shown in Figures 1 to 10, the disks are shown rigidly clamped axially with spacers of specific thickness between them so that the distance between the disks could be mechanically maintained at a predetermined gap. With such a construction, the gap between plates cannot be adjusted. Figures 11 and 12 show a structure in which spacers between disks are omitted and adjustment means are provided for predetermined gap between the plates which gap will be automatically maintained by the fluid between the disks when the structure is in operation. With such adjustment means for the gap, the desired viscous friction and damping constant developed by the disks may be established.

Referring to Figures 11 and 12, the housing for the disks and viscous fluid comprises a base 104, a cylindrical wall 105 extending from the base, and the clamping wall or cover 106 which has threaded engagement in the outer end of the cylindrical wall. The cover wall has the bearing flange 107 extending therefrom through which the shaft 108 extends, a roller bearing 109 within the flange journaling the shaft at its outer end. Within a recess 110 in the base wall 104 is received an annular bearing plate 111 which is secured to the inner end of the shaft as by threading thereto, this plate 111 forming a bearing support for the inner end of the shaft. The hub 112 of the shaft is splined as indicated at 113 to receive the splined axial openings 114 of the disks 115 for connecting of the disks for rotation with the shaft. Interspaced with the shaft disks 115 are the housing disks 116 which are connected to rotate with the housing by the engagement of the tongues 117 of the disks in the grooves or channels 118 in the inner side of the cylinder wall 105.

Resting against the inner side of the base wall 104 and the bearing plate 111 is the annular plate 119 which surrounds the shaft and extends to the cylinder wall 105, the plate being held by screws 120 to the base wall 104 to prevent axial displacement of the bearing plate 111 and to prevent the base wall 104 from rotating. The shaft and housing disks are received between this backing plate 119 and the annular outer plate 121. The inner end plate 119 surrounds the short hub 111' on the bearing plate 111 but is free therefrom and is connected to the cylinder wall 105 by tongues 119' thereon engaging in the grooves 118 in the wall 105 so as to be held against rotational movement. The outer end plate 121 surrounds the shaft hub but is free therefrom and is connected to the cylinder wall 105 by tongues 122 thereon engaging in the grooves 118 in the wall 105 so as to be movable axially relative to the wall 105 but held against rotational movement. Before the cover wall 106 is applied to the cylinder wall 105, the shaft and housing disks are slipped axially onto the shaft and housing and the end plate 121 is then slipped into place. The cover 106 has outer and inner annular abutments 123 and 124 thereon for engagement with the outer end plate 121 when the cover is screwed into the end of the cylinder wall 105. The setting of this cover will thus determine the axial distance between the inner and outer end plates 119 and 121 and the axial spacing between the disks when the structure is in operation, the disks moving relatively axially under pressure of the viscous fluid to assume their proper relative spacing when the structure is in operation. This spacing of the disks as determined by the setting of the cover 106 will determine the viscosity resistance of the fluid to relative rotation of the shaft and housing disks.

The viscous fluid is forced in under pressure into the space 125 in the cover between the abutments 123 and 124, the fluid being charged in through a suitable fitting 126 to a level as determined by a drain plug 127 which can be placed in any convenient position to allow for an air space above the fluid in the space 125. The fluid finds its way into the spaces between the disks when the structure is operated, the disks then assuming their uniform spacing relative to each other. The viscosity resistance of the fluid between the plates will damp the rotation of the shaft relative to the housing structure and this viscosity resistance can be increased or decreased by the setting of the cover 106. This manual adjustment for variation in the damping constant of the structure forms a very important feature of my invention.

Figure 13:
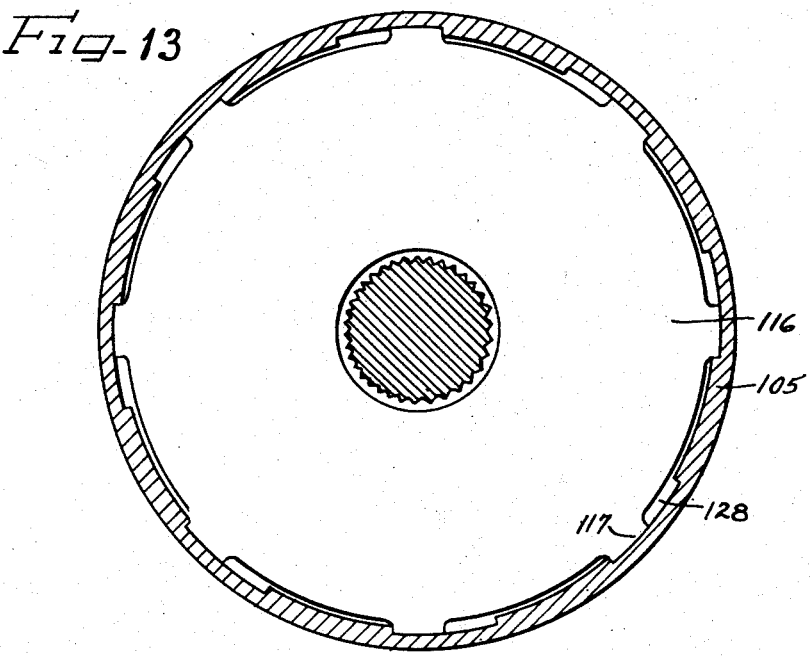
Figure 13 is a view like Figure 12 showing a modified arrangement for operation of the housing supported disks.

Figure 13 shows a modified arrangement for the structure shown on Figures 11 and 12. Provision is made for a period of unrestrained or free movement of the shaft relative to the housing structure. The axially extending channels or grooves 128 in the cylinder wall 105 are wider than the tongues 117 on the housing disks 116. Thus, when the shaft rotates with its disks, the disks 116 on the housing structure will be pulled along or rotated with the shaft disks by the viscosity resistance of the fluid between the disks, until the tongues make contact with the sides of the channels 128. After this period of free and unrestrained movement of the shaft, the housing disks will be held stationary and further rotation of the shaft will be retarded and damped in proportion to the speed of rotation of the shaft. Where the structure is used as a shock absorber in an automotive vehicle, the shaft will have a free center or free period movement relative to the housing structure whereafter further rotation of the shaft will be viscously damped.

Figure 14:
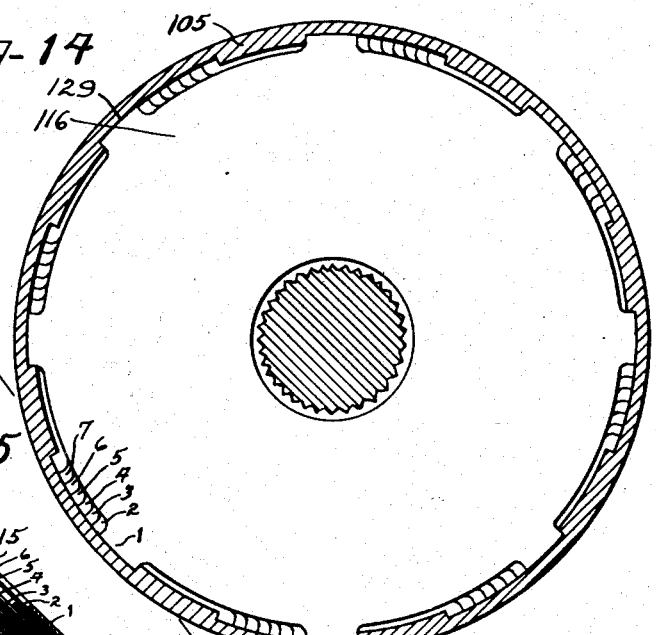
Figure 14 is a view like Figure 12 showing another modified arrangement for operation of the housing supported disks.
Figure 15:
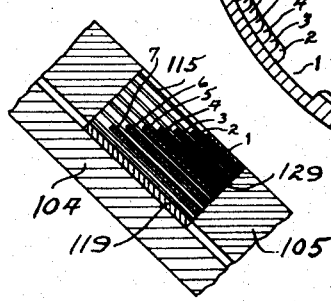
Figure 15 is a section on plane XV—XV of Figure 14.

Figures 14 and 15 show a further modified arrangement for the structure shown on Figures 11 and 12. In this modified arrangement, provision is made for a comparatively free center or period of rotation of the shaft, but with the housing disks successively rotated by the shaft disks into operative position. Referring to Figures 14 and 15, the channels 129 in the housing wall 105 are widened and the tongues on the housing disks 116 are of successively greater width, but of less width than that of the channels. A stack of seven housing disks is shown having respectively tongues 1, 2, 3, 4, 5, 6 and 7 thereon of progressively increased width, the widest tongue 7 being of less width than that of the channels 129. The shaft is shown rotating in counterclockwise direction with one edge of the tongues abutting the end walls of the channels, all of the housing disks 116 being thus stationary while the shaft disks 115 are being rotated therebetween, and the shaft is subjected to the full viscosity resistance of the fluid between the disks. If the shaft is now rotated in clockwise direction, the housing disks 116 will be dragged along with the shaft disks 115 until the opposite edges of the tongues progressively contact the other ends of the channels, and the housing disks will thus be successively brought into operative position until they are all locked against rotation relative to the housing, whereafter the full viscosity resistance and damping will be supplied to the shaft. Thus, the shaft may rotate through a comparatively free center or period but with the resistance to such rotation progressively increased until the full viscosity resistance functions.

Figure 16:
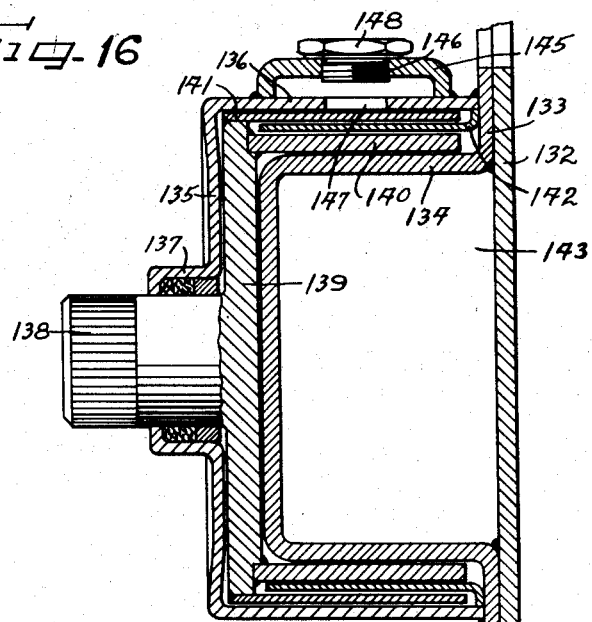
Figure 16 is a diametral section of a damper structure in which the blades are tubular.

Figure 16 shows a shock absorber in which the interspaced blades are of tubular instead of disk form. The housing comprises the base 132 to which is secured the back wall 133 whose central portion is deflected to provide the bearing projection 134. The cup-shaped housing part 135 is secured at its outer edge to the back wall 133 with its cylindrical wall 136 spaced from the bearing projection 134, a bearing projection 137 receiving the shaft 138 which extends from the circular wall 139 disposed between the housing part 135 and the bearing projection 134. Extending from the wall 139 are the spaced apart inner and outer tubular concentric blades 140 and 141. The inner blade 140 receives the bearing projection 134 to form a bearing support for the wall 139 and the shaft, while the outer blade 141 is spaced a distance away from the cylindrical wall 136 of the housing structure. A tubular blade 142 is secured to and extends from the back wall 133 between the blades 140 and 141 on the shaft wall 139 and is spaced from the blades. The tubular blades 140 and 141 extending from the shaft wall 139 rotates with the shaft, while the cylindrical wall 136 forms a blade which, with the blade 142, is stationary on the housing structure. An expansion chamber 145 is provided on the housing into which the viscous fluid may be charged through the filler opening 146 for flow through a passageway 147 into the spaces between the blades. After filling of the structure, the filler opening is closed by a plug 148. The fluid in the spaces between the shaft supporting wall 139 and the adjacent walls of the housing structure will add its viscosity resistance to that of the fluid between the tubular blades for damping the rotation of the shaft.

Figure 17:
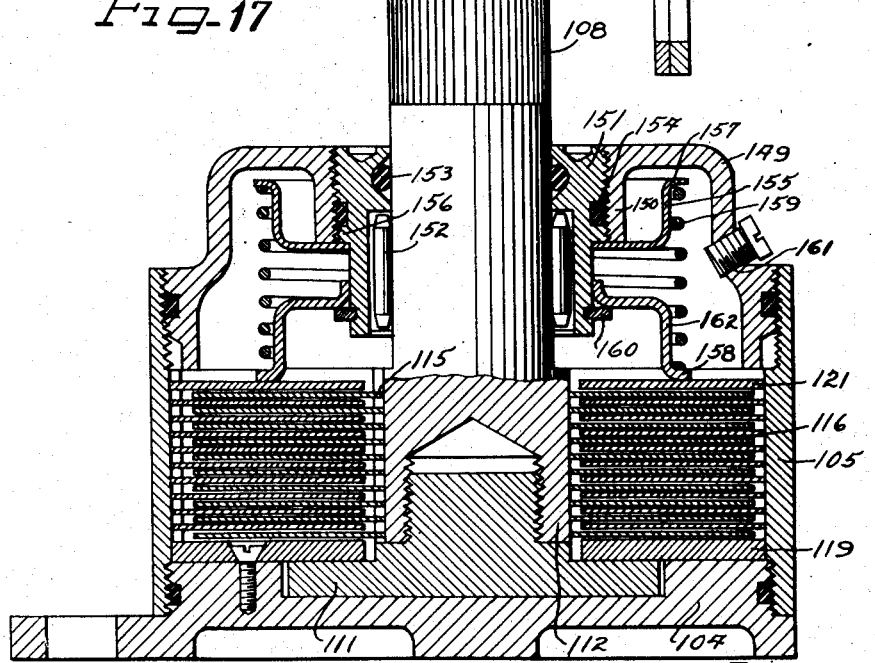
Figure 17 is a diametral section of a damper structure in which provision is made for adjustment of the spacing between disks and the regulation of relief or blow-off of generated pressure.

Figure 17 shows a structure like that on Figures 11 and 12 which, in addition to providing for adjustable plate spacings, also provides for blow-off regulation. Like the structure shown on Figure 11, the structure on Figure 17 comprises the base 104, with the cylindrical wall 105 extending therefrom, the shaft 108, the inner end plate 119, the outer end plate 121, and the shaft and housing disks 115 and 116. The cover 149 houses various elements which, with the cover, form a subassembly which is bodily removable. The cover has threaded connection with the cylindrical wall 105 and depending from its top wall is the flange 150 which is internally threaded to receive a bearing bushing 151 which surrounds the shaft 108 and supports antifriction rollers 152 for journaling the shaft, the bushing supporting a sealing gasket 153 to seal against leakage of viscous fluid outwardly along the shaft. A thread seal ring 154 is also interposed between the bushing and the flange 150.

An upper annular spring retainer ring 155 receives the bushing for abutment against the shoulder 156 thereon which is normally flush with the end of the flange 150. A lower spring retainer ring 162 receives the bushing below the ring 155, the two rings having respectively flanges 157 and 158 thereon forming seats for the ends of a helical spring 159. This spring is preloaded and tends to move the lower retainer ring away from the upper retainer ring, this distance of movement of the retainer rings being limited by a snap ring 160 on the lower end of the bushing 151. When the cover 149 is away from the housing body, the spring will hold the lower retainer ring against the snap ring. When the structure is assembled, the cover is screwed into the housing body and suitable viscous fluid is charged in through a filler opening 161, and then when the structure is operated, the pressure of the fluid will space apart the shaft and the housing disks. If the cover were primarily screwed in a distance just sufficient for engagement of the lower retainer ring flange 158 with the outer end plate 121, and with the inner spring retainer still being held against the snap ring, then the spacing or gap between the disks would be at its maximum. If the cover were screwed in further, then the gap between the disks would be decreased, the lower retainer ring 162 being still in contact with the snap ring 160. The resistance to rotation of the shaft relative to the housing structure is proportional to the axial pressure of the disks against the fluid therebetween and is also proportional to the speed of rotation of the shaft disks relative to the housing supported disks. Further loading of the spring 159 may be effected by screwing the bushing 151 outwardly in the cover flange 150, thus shortening the distance between the upper retaining ring flange 157 and the lower retaining ring flange 158. To obtain the original disk spacing, the cover 149 is screwed into the cylindrical wall 105 by the same axial distance as the bushing 151 was screwed outwardly. When the shaft is rotated at such speed that the fluid pressure between the disks overcomes the spring load, then the disks are forced apart to increase the spacing therebetween until normal pressure conditions are resumed. Pressure blow-off or relief is thus provided for the damper structure to hold the damping power thereof within a predetermined limit. Thus, by the adjusting means provided by the cover and bushing, proper setting may readily be made for the desired disk spacing and blow-off regulation.

I have thus produced efficient damper structure in which relative oscillation or rotation of two structures is damped by the viscosity resistance or resistance to shear of viscous fluid between the adjacent surfaces of disks or blades carried by the respective structures. My improved structures may be efficiently used to function as clutches, couplings, and the transmission of power and where relative movement between structural elements is to be continuous or interrupted or with uniform or variable speeds.

I have shown practical and efficient embodiments of the various features of my invention, but I do not desire to be limited to the exact construction, arrangement or operation shown and described, as changes and modifications may be made without departing from the scope of the invention as defined in the appended claims.

I claim as my invention:

1. A damper structure comprising a housing element defining a cylinder space, a shaft element journaled by said housing concentric with said cylinder space, a set of disks mounted on said shaft element to rotate therewith but being free for axial movement thereon, a companion set of disks mounted on said housing element and free to move axially thereon, the disks on said shaft element interleaving with the disks on the housing element, said cylinder space being filled with viscous fluid and relative rotation of said elements causing said viscous fluid to flow between the interleaved disks for axial spacing thereof, an abutment for holding said disks axially in said cylinder space, means for setting said abutment axially for determining the axial extent of the cylinder space and thereby the spacing between the disks during relative rotation of said elements, the spacing between the disks determining the viscosity resistance of the fluid to such relative rotation.

2. A damper structure comprising a housing, a shaft extending into said housing, said shaft and housing defining an annular cylinder space, disks extending from said shaft through said cylinder space and being mounted to rotate with the shaft but being free for axial movement thereon, disks extending from said housing through said cylinder space and being mounted to rotate with said housing but being free for axial movement thereon, the disks on said shaft being interleaved with the disks on said housing, said cylinder space being filled with viscous fluid, the combined thickness of the interleaved disks being less than the axial width of said cylinder space whereby during relative rotation of said shaft and housing the viscous fluid will cause said interleaved disks to be equally spaced apart and the viscosity resistance of the fluid will dampen the relative rotation of the shaft and housing.

3. A damper structure comprising a housing, a shaft extending into said housing, said shaft and housing defining an annular cylinder space, disks extending from said shaft through said cylinder space and being mounted to rotate with the shaft but being free for axial movement thereon, disks extending from said housing through said cylinder space and being mounted to rotate with said housing but being free for axial movement thereon, the disks on said shaft being interleaved with the disks on said housing, said cylinder space being filled with viscous fluid, the combined thickness of the interleaved disks being less than the axial width of said cylinder space whereby during relative rotation of said shaft and housing the viscous fluid will cause said interleaved disks to be equally spaced apart and the viscosity resistance of the fluid will dampen the relative rotation of the shaft and housing, and means for increasing or decreasing the axial width of said cylinder space and thereby the spacing between disks to thereby correspondingly decrease or increase the viscosity resistance to relative rotation of the shaft and housing.

4. A damping structure comprising relatively rotable concentric elements defining a cylinder space for containing viscous fluid, disks splined to one of said elements and extending therefrom into said cylinder space, disks splined to the other element and extending therefrom into said cylinder space in interleaving relation with the first mentioned disks, a movable end wall for said cylinder space, and means for setting said end wall to determine the axial width of said cylinder space and thereby the spacing between interleaved disks during relative rotation of said elements.

5. A damping device comprising a housing and a shaft extending therein to define therewith an annular cylinder space for containing viscous fluid, an assembly of disks extending into said space from said shaft and mounted to rotate therewith, a second assembly of disks extending into said cylinder space to interleave with the disks on the shaft, means affording a period of delayed connection between said second disk assembly and said housing during which said second disk assembly will be rotated with the shaft disk assembly by the viscosity drag of the fluid between the interleaved disks, and means effective at the ends of said period for connecting said second disk assembly with said housing whereafter rotation of said shaft disks relative to said second assembly disks will be damped by the viscosity resistance between the interleaved disks.

6. A damping device comprising a housing and a shaft extending therein to define therewith an annular cylinder space for containing viscous fluid, an assembly of disks extending into said space from said shaft and mounted to rotate with said shaft, a second assembly of disks extending into said cylinder space to interleave with the disks on the shaft, connecting means for connecting said second disks with said housing for holding of said disks by said housing against rotation with the shaft disks when the shaft is rotated whereby the viscous resistance of the fluid between the interleaved disks will dampen the rotation of said shaft, and means whereby the functioning of said connection is delayed for a period during which said second set of disks may be rotated with the shaft disks by the viscous drag of the fluid between the interleaved disks.

7. A damping device comprising a housing and a shaft extending therein and defining therewith an annular cylinder space for containing viscous fluid, a set of disks extending outwardly into said space from said shaft and mounted to rotate with said shaft, a second set of disks extending inwardly into said space in interleaving relation with said shaft disks, and a connection for connecting said second set of disks with said housing including a lag period during which said second set of disks will be rotated with said shaft disks by the viscosity drag of the fluid between the interleaved disks for connection of said second set of disks with said housing for rotation of the shaft disks relative to said housing held disks and damping of the shaft movement by the viscosity resistance of the fluid between the interleaved disks.

8. A damping structure comprising relatively rotatable concentric elements defining a cylinder space for containing viscous fluid, an assembly of disks extending from one of said elements into said space, a second assembly of disks extending into said space in interleaving relation with the disks of said first assembly, abutments on said second assembly and the remaining concentric element, means whereby said abutments will be out of engagement during a period of relative rotation of said elements whereby said disk assemblies will be moved together by the viscosity drag of the fluid between the interleaved disks and relative rotation of said elements will be substantially unretarded, engagement of said abutments after such period of disengagement thereof causing said disk assemblies to be moved relative to each other whereby the viscosity resistance of the fluid between the interleaved disks will dampen the relative rotation of said elements.

9. A damping structure comprising a stationary housing, a shaft journaled in said housing and defining therewith an annular cylinder space, an assembly of disks mounted on said shaft for rotation therewith and extending therefrom into said cylinder space, a second set of disks extending from said housing into said cylinder space in interleaving relation with the disks extending from said shaft, said cylinder space being filled with viscous fluid for engagement in the spaces between the interleaved disks, tongues on the peripheries of said second set of disks and said housing having slots for receiving said tongues, said slots being wider than said tongues whereby during a period of rotation of said shaft said second set of disks will be free to rotate with the shaft disks and rotation of the shaft will be substantially unretarded, engagement of said tongues with the ends of said slots holding said second set of disks against rotation whereby rotation of the shaft will then be correspondingly damped by the viscosity resistance of the fluid between and in engagement with the interleaved disks.

10. A damping device comprising a stationary housing, a shaft journaled in said housing to define therewith an annular cylinder space for containing viscous fluid, a set of disks mounted on said shaft to rotate therewith in said cylinder space, a set of disks extending from said housing into said cylinder space for interleaving with the disks extending from said shaft, an elongated slot in the wall of said housing adjacent to the periphery of the disks extending therefrom, and tongues extending from the peripheries of said disks into said slot, the tongues on successive disks being of increasing width but of less width than that of said slot whereby when said shaft is rotated the tongues on said disks will be brought successively into abutting engagement with one end of said slot during which period the rotation of said shaft will be progressively damped until all the disks are brought into engagement with the housing by the viscosity resistance of the fluid between the shaft disks and the housing disks.

11. A damping structure comprising relatively rotatable concentric elements defining a cylinder space for containing viscous fluid, a set of disks mounted on one of said elements to rotate therewith, a set of disks mounted on the other element for interleaving with the disks on said first mentioned element, the viscosity resistance of the hydraulic fluid between and in engagement with the interleaving disks retarding and damping the relative rotation of said disks, and means for increasing or decreasing the effective surface area of said disks exposed to the fluid for corresponding damping of the relative rotation of said elements.

12. A damping structure comprising relatively rotatable concentric elements defining a cylinder space for containing viscous fluid, a set of disks mounted on one of said elements to rotate therewith, a set of disks mounted on the other element for interleaving with the disks on said first mentioned element, the viscosity resistance of the hydraulic fluid between and in engagement with the interleaving disks retarding and damping the relative rotation of said disks, the disks of said sets having holes therethrough which are brought into register or out of register during relative rotation of said elements for corresponding variation in the viscous damping of such relative rotation.

13. A viscous rotary damper structure comprising concentric relatively rotatable elements defining a cylinder space for containing viscous fluid, a set of disks mounted on one of said elements for extending through said space, a support on said other element and a set of disks on said support extending into said cylinder space in interleaving relation with the disks of the first mentioned set, and a one-way coupling connection between said other element and said support for free rotation of said other element in one direction and for connecting said other element with said support when said other element is rotated in the opposite direction whereby said disks on said support will be rotated relative to said other disks for damping of the rotation of said other element by the viscous resistance of the fluid between and in engagement with the interleaving disks.

14. A viscous rotary damper structure comprising a stationary cylinder element, a shaft journaled in said cylinder element, said cylinder element being filled with viscous fluid, a set of disks extending from said cylinder element, a support surrounding said shaft and supporting a set of disks interleaving with the disks on said cylinder element, and a one-way clutch connection between said shaft and said support.

15. In combination in a rotary damper construction, means defining a fluid tight housing having a chamber therein for a viscous damping fluid, a shaft cooperatively mounted with respect to the housing and the housing and the shaft being relatively rotatable, the housing means having within said chamber a plurality of axially facing spaced working surfaces of substantial area, said shaft having working surfaces opposing said housing surfaces in closely spaced relation, such spaced relation between the surfaces being in operation of such closeness as to accommodate but a thin shear film of the viscous fluid between the opposed surfaces, said working surfaces being relatively adjustable in unison to render the shear film therebetween substantially uniform, and the working surfaces of the housing and of the shaft being relatively moveable rotatably in operation but restrained in such relative movement by the action of the viscous shear films between the opposing surfaces.

16. In combination in a viscous rotary damper, a housing structure defining a fluid tight chamber for a fill of viscous damping fluid, a shaft operatively disposed in said chamber, said shaft and said housing structure being relatively rotatable, a set of thin disks coupled with the housing and being in mutually spaced relation within said chamber and centrally apertured concentric with said shaft, and a set of thin disks coupled with said shaft and interleaved with the first mentioned disks, the spacing between said disks being such that the opposed surfaces of the interleaved disks are in operation in shear film relation so that a shear film of the viscous fluid intervenes between the opposing disk surfaces, the set of disks on the shaft being axially adjustable in unison relative to the first mentioned disks to render the spacing between all of the interleaved disks substantially uniform.

17. In combination in a viscous rotary damper, a housing structure defining a fluid tight chamber for a fill of viscous damping fluid, a shaft operatively disposed in said chamber, said shaft and said housing structure being relatively rotatable, a set of thin disks coupled with the housing and being in mutually spaced relation within said chamber and centrally apertured concentric with said shaft, and a set of thin disks coupled with said shaft and interleaved with the first mentioned disks, the spacing between said disks being such that the opposed surfaces of the interleaved disks are in operation in shear film relation so that a shear film of the viscous fluid intervenes between the opposing disk surfaces, said set of first mentioned disks being axially movable relative to the shaft and in unison to effect substantially uniform spacing between the two sets of interleaved disks.

18. In combination in a viscous rotary damper, a housing structure defining a fluid tight chamber for a fill of viscous damping fluid, a shaft operatively disposed in said chamber, said shaft and said housing structure being relatively rotatable, a set of thin disks in spaced relation within said chamber and centrally apertured concentric with said shaft, and a set of thin disks coupled with said shaft and interleaved with the first mentioned disks, the spacing between said disks being such that the opposed surface of the interleaved disks are in operation in shear film relation so that a shear film of the viscous fluid intervenes between the opposing disk surfaces, both of said sets of disks being free to find an optimum relative spacing for uniformity of shear films therebetween, and means for limiting axial movement of the sets of disks.

BERNARD E. O'CONNOR.

REFERENCES CITED

The following references are of record in the file of this patent:

UNITED STATES PATENTS

| Number | Name | Date |
|---|---|---|
| 669,568 | Webb | Mar. 12, 1901 |
| 1,228,215 | Junkers | May 29, 1917 |
| 1,238,447 | Senery | Aug. 28, 1917 |
| 1,718,175 | Nilson | June 18, 1929 |
| 1,854,952 | Nilson | Apr. 19, 1932 |
| 2,070,709 | Carter | Feb. 16, 1937 |
| 2,182,076 | Elmer | Dec. 5, 1939 |